Patented Sept. 9, 1930

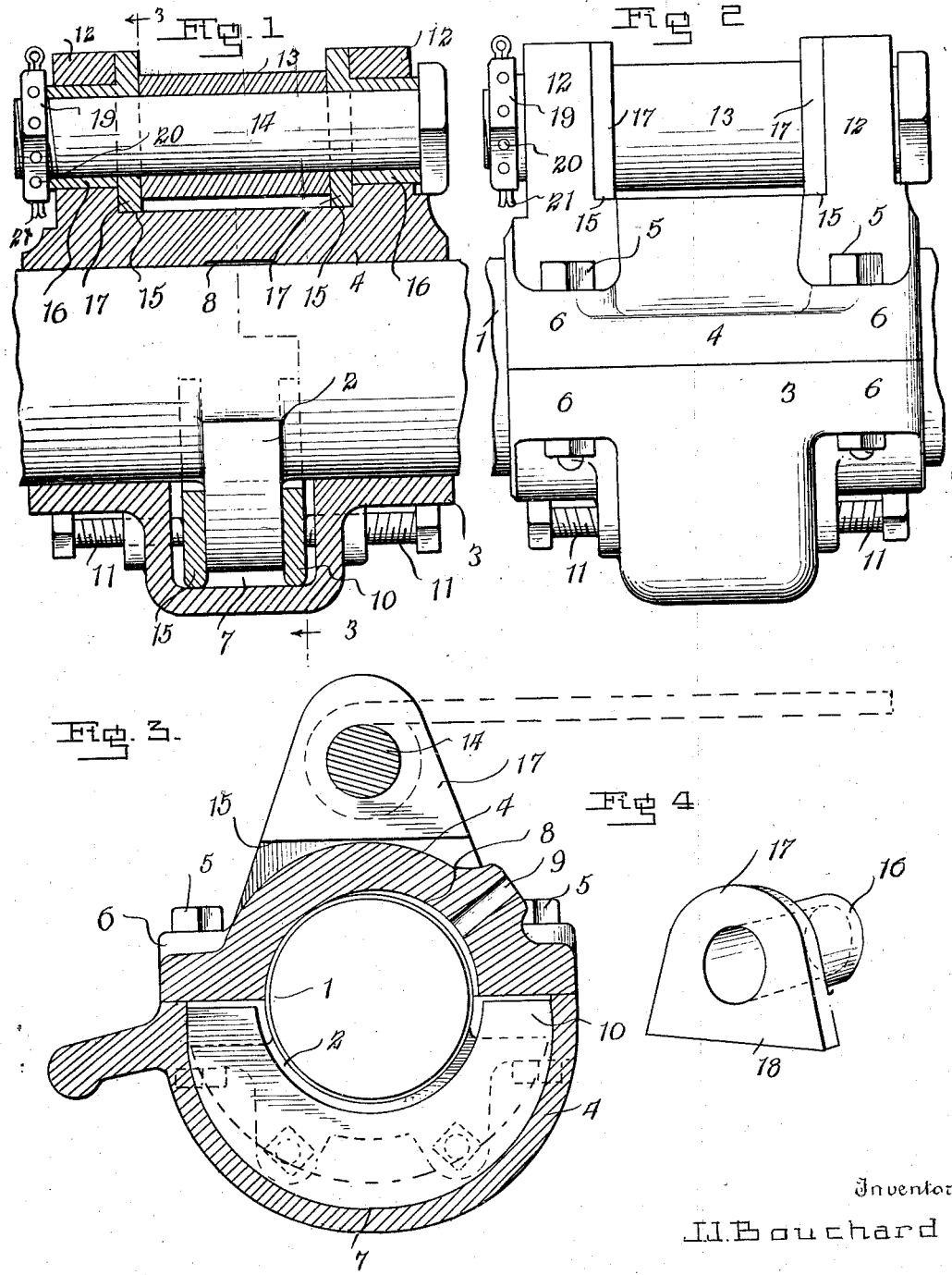

1,775,305

UNITED STATES PATENT OFFICE

JOHN J. BOUCHARD, OF BRADFORD, PENNSYLVANIA

VEHICLE SPRING MOUNTING

Application filed February 14, 1928. Serial No. 254,283.

This invention relates to the mounting or support for springs disposed between the running gear and the bodies of vehicles and has special reference to the springs employed in a certain type of automobile. In the devices of the class to which this invention relates, the end of the spring is carried by a saddle mounted upon the rear axle housing, the housing being provided with a block or rib on its under side which fits within a channel or groove in the spring saddle for the purpose of preventing the saddle moving along the housing and thereby disturbing the relation of the spring to the other parts. In actual practice, there is considerable wear between the saddle and the block or rib on the axle housing so that it frequently becomes necessary to compensate for the wear. According to the construction now generally employed, it is necessary to disassemble the saddle and remove the same from the axle housing and then insert specially cut shims to fit between the sides of the projection on the housing and the walls of the channel in the saddle. It is also frequently necessary to insert washers between the edges of the spring and the shackle bearings between which the end of the spring is mounted, and the object of the present invention is to provide a simple, inexpensive and efficient construction whereby the adjustment of these parts may be effected to compensate for wear without requiring the disassembling and subsequent reassembling of any of the elements. This object is attained in such a device as is illustrated in the accompanying drawing and the invention resides in certain novel features which will be hereinafter first fully described and then particularly defined in the appended claims.

In the drawing:

Fig. 1 is a view showing a portion of the axle housing in side elevation and the saddle and cooperating parts in section.

Fig. 2 is an elevation of the same.

Fig. 3 is a transverse section on the line 3—3 of Fig. 1.

Fig. 4 is a detail perspective view of one of the bushings.

In the drawing, the reference numeral 1 denotes a portion of the axle housing constructed with a semi-annular rib or depending block 2 on its under side. The spring saddle comprises a lower member 3 and an upper member 4 which are constructed to encircle the housing 1 and be secured about the same by bolts 5 or the like inserted through mating flanges or lugs 6 upon the saddle members. The lower saddle member is formed with an annular channel 7 which receives the block 2 upon the housing, as will be understood upon reference to Figure 1 of the drawing, and the upper member is provided with a semi-cylindrical groove or chamber 8 to receive the upper portion of the housing, and has an opening 9 formed radially through its wall whereby lubricant may be passed to the chamber 8 to avoid excessive wear between the contacting surfaces of the housing and saddle. Fitted within the channel 7 of the saddle and between the side walls of the same and the sides of the rib or block 2, are arcuate wear plates 10 which are substantially semi-circular so as to conform to the channel and fit under the axle housing. Mounted in the sides of the channel are set bolts 11 which have their inner ends bearing against the outer sides of the plates 10 so that by properly adjusting the bolts, the plates may be held to the rib or block 2, as shown clearly in Fig. 1. By this arrangement, I prevent the endwise movement of the saddle upon the housing and am enabled to take up wear without disassembling the saddle or removing the same from the housing.

The upper saddle member 4 is provided with spaced upstanding perforated lugs or ears 12 between which the end of the spring 13 is received, the end of the spring being formed into an eye in the usual manner and a retaining bolt 14 being inserted through the lugs 12 and the eye 13 so as to secure the saddle in an obvious manner. The saddle member 4 is so shaped as to provide flat shoulders 15 on the inner sides of the lugs or ears 12, at the bases thereof, and bushings 16 are fitted through the lugs 12 and provided at their inner ends with heads 17 each having a straight lower edge 18 adapted to rest securely upon the respective shoulder 15 and thereby prevent turning of the bushings. The bushings fit around the shackle bolt 14, as shown in Fig. 1, and initially they are somewhat longer than the openings through the lugs 12 so that the ends of the bushings will project outwardly beyond the sides of the lugs. One bushing abuts the head of the bolt 14 while the other bushing will abut the retaining nut 19 mounted on the outer end of the bolt, and this retaining nut may be locked on the bolt in any approved manner. I have shown the nut as provided with a plurality of radial openings 20 adapted to register with a diametric opening in the bolt and receive a cotter pin or other form of key 21 whereby relative rotation of the nut and the bolt will be prevented. When the spring or the heads of the bushings have become so worn that the spring may rattle, it is necessary merely to withdraw the key 21 and then turn the nut home against the adjacent bushing, thereby causing the bushings to move inwardly through the shackle lugs 12 and properly engage the side edges of the spring. It will be understood, of course, that the bolt will be provided with a plurality of diametric passages so that the nut may be locked thereto in any position in which it may be set.

From the foregoing description, taken in connection with the accompanying drawing, it will be seen that I have provided an exceedingly simple structure whereby wear upon the vehicle spring or the saddle, or the axle housing, may be taken up easily and quickly without requiring any disassembling and subsequent reassembling, or removal of the saddle or any of its parts from the housing. The saddle may rock upon the axle housing as fully and in the same manner as it rocks in the constructions now generally employed and the cost of installing my improvements will be less than the cost of the time now lost in disassembling and rebuilding the spring mounting as the same is ordinarily constructed.

Having thus described the invention, what I claim is:

1. The combination with an axle housing having a block on its under side and a spring saddle encircling the housing and provided in its under portion with a channel receiving said block, of wear plates fitting within the channel of the saddle between the side walls of the channel and the sides of the block, and means mounted in the walls of the channel for maintaining the plates in abutting relation to the block.

2. The combination with an axle housing having a block on its side, and a saddle provided with a channel receiving the block, of wear plates fitting within the channel between the block and side walls of the channel, and means to maintain said plates against side faces of the block.

3. The combination with an axle housing having a block on its side, and a saddle provided with a channel receiving the block, of wear plates fitting within the channel between the block and side walls of the channel, and means to maintain said plates against side faces of the block adjustably carried by side walls of the channel whereby wear upon the plates and block may be compensated for.

4. The combination with an axle housing having a block on its side, and a saddle provided with a channel receiving the block, of wear plates fitting within the channel between the block and side walls of the channel, and set screws threaded through openings in the side walls of said channel and at their inner ends engaging said plates to maintain the plates in engagement with side faces of the block.

In testimony whereof I affix my signature.

JOHN J. BOUCHARD.